UNITED STATES PATENT OFFICE.

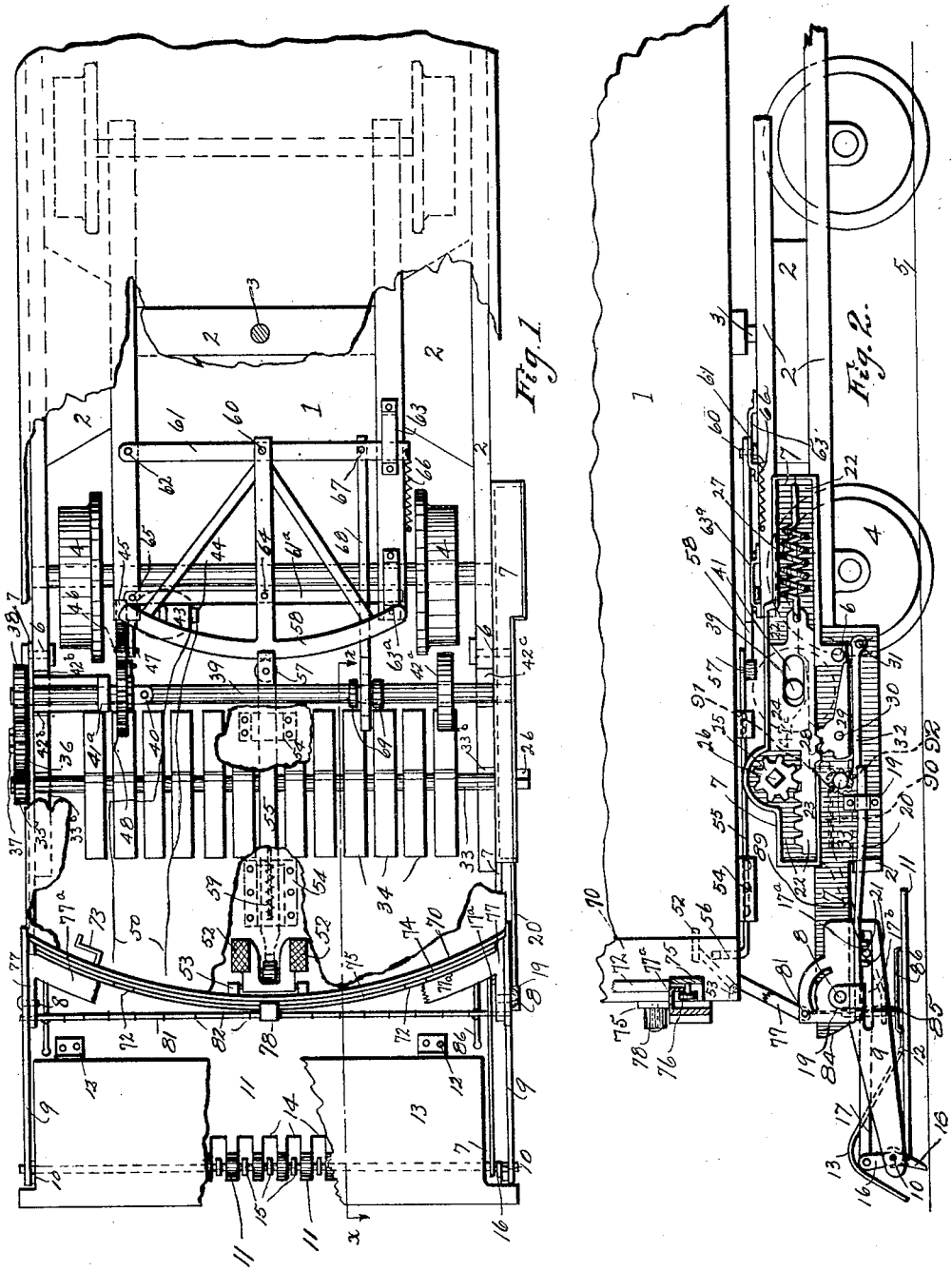

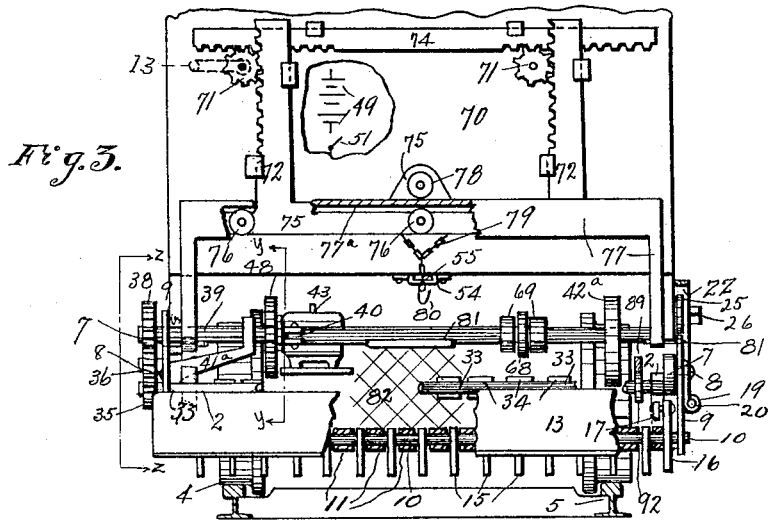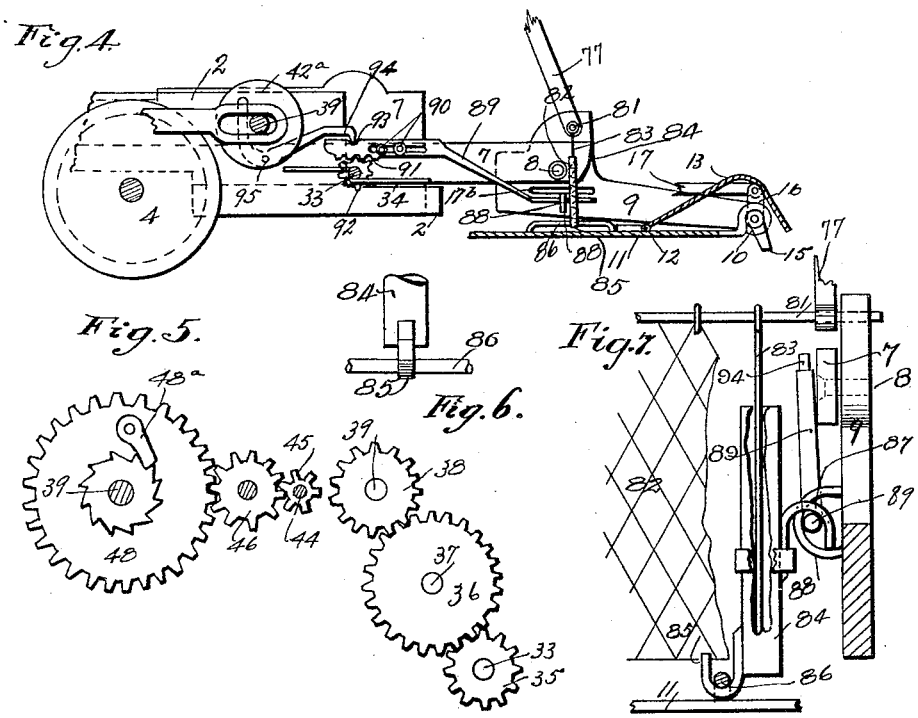

McKENDRIE A. SPRAGUE, OF SEATTLE, WASHINGTON.

CAR-FENDER.

1,118,245.  Specification of Letters Patent.  Patented Nov. 24, 1914.

Application filed March 5, 1912. Serial No. 681,817.

*To all whom it may concern:*

Be it known that I, McKENDRIE A. SPRAGUE, a citizen of the United States, and a resident of Seattle, in the county of King, State of Washington, have invented certain new and useful Improvements in Car-Fenders, of which the following is a specification.

The principal object of this invention is to render more efficient the construction shown and described in my pending application No. 569,164, filed June 27, 1910 and renewed as Serial No. 778,224, July 9, 1913 particularly in respect to the means for raising and lowering the fender with respect to the car body, and also in regard to the means for throwing my device into operative engagement with the traction wheels of the car.

The invention will be fully described in the following specification and shown in the accompanying drawings, in which—

Figure 1 is a plan view of my device applied to a street car, the forward truck only being shown, the frame work of the truck and the body of the car being broken away. Fig. 2 is a side elevation, looking toward the left, of Fig. 1. Fig. 3 is a front end elevation, parts being broken away. Fig. 4 is a detached detail view of one side of the frame work, partly in section upon the line $x-x$ of Fig. 1 looking toward the right. Fig. 5 is an enlarged detail view of a portion of the gearing, partly in section, on the line $y-y$ of Fig. 3, looking toward the left. Fig. 6 is a view of another portion of the gearing, embraced in the outline $z-z$ of Fig. 3, looking toward the right. Fig. 7 is an enlarged broken detail view of the plate releasing means and associated parts.

Referring now more particularly to the drawings the reference character 1 designates the body of the car; 2, the front truck; 3, the king bolt which connects the car to the truck; 4, the traction wheels; 5, the rails of the car tracks. Pivoted at 6, to the truck frame 2, are the side arms 7 of my device, at each side of the truck frame one of the arms 7 is of considerable thickness except at its extreme forward end and is box-like at its thicker portion to contain certain parts, as will be hereinafter explained. At the free ends of the arms 7 are pivoted, at 8, the supplemental arms 9, to the lower edges of which is pivoted, upon the rod 10, the plate 11, to which is hinged, at 12, the curved cover 13. Extending downwardly through the cut out portions 14, in the plate 11, are the fingers 15, which project rigidly from the rod 10, the latter being revoluble in its bearings in the supplemental arms 9. Secured to one end of the rod 10 is the lever 16, to the upper end of which is connected the link 17, upon the rear end of which is the stud $17^a$ which projects through the slot $17^b$ in one of the arms 9 (see Fig. 2). Slidably mounted in its bearings 19 is the rod 20, from which downwardly project the lugs 21 so as to straddle the stud $17^a$. The bearing 19 nearer the forward end of the device is in loop form, as shown in Figs. 2 and 3, and freely swings upon the pin 8. Slidably mounted within the chamber 22 in one of the arms 7 is the rack member 23 which is enlarged at 24 so as to slidingly fit between the upper and lower walls of the chamber 22. Meshing with the upper teeth of the rack member 23 is the pinion 25, having the angular extension 26 to which a crank may be applied to draw the rack member 23 toward the left against the tension of the spring 27, one end of which is secured to the arm 7 and its opposite end to the rack member 23, as shown in Fig. 2. With the lower teeth 28 of the rack member 23 mesh the teeth of the member 29 which is pivoted, at 30, to the arm 7. Pivoted at 31 is the bar 32, which, when the rack member 23 is drawn toward the left, is swung upwardly into its position as shown in Fig. 2 and there locked by sliding the rod 20 under its free end. Revolubly mounted in the arms 7 is the shaft 33 from which extend radially the flat projections 34, which constitute the revolving portion of my improved fender. The sides of the truck frame 2 are notched or recessed as at $33^b$ so as to allow the ends of the shaft 33 to extend out to the arms 7 in such manner as not to interfere with the upward pivotal movement of the arms 7 with relation to the truck frame 2. Secured to the left hand end of the shaft 33 is the gear wheel 35, which meshes with the similar wheel 36, which revolves upon its stud 37 extending from the arm 7. In mesh with the wheel 36 is the wheel 38, which is secured to the shaft 39, revolubly mounted between the arms 9, and in which is the joint 40 to allow for the lateral movement of the right hand end of the shaft 39 in the its elongated bearing 41 (see Fig. 2), the left hand end of the shaft 39 being additionally supported by the arm $41^a$ extending rigidly from the arm 7, and to its right hand end is secured the friction wheel 42ª. The sides of the truck frame are notched at 42ᵇ and 42ᶜ to allow the passage of the shaft 39 and the bracket 41ª, and for the same reason that the notches 33ᵇ are cut, as above explained.

Mounted upon the truck 2 is the motor 43, to the shaft 44 of which is secured the gear wheel 45 which meshes with the wheel 46, which revolves with relation to its supporting bracket 47 projecting from the frame work of the truck 2 (see Fig. 1). Meshing with the wheel 46 is the wheel 48 which is loose upon the shaft 39 but adapted to rotate therewith by means of the ratchet and pawl mechanism 48ª, the ratchet being fixed to the shaft. 49 is a battery or other source of electrical energy which is connected to the motor 43 by the wires 50. 51 indicates a switch, normally open. Upon the floor of the car is mounted the treadle 52 pivoted at 53. Slidably mounted in the bearings 54, secured to the bottom of the car, is the reach 55, which is upturned at 56 to contact with the under surface of the treadle 52. At the rear of the reach 55 is the roller 57 which is normally held out of contact with the sector 58 by the spring 59, which normally draws the reach 55 toward the left. The sector 58 is pivoted, at 60, to the bar 61, one end of which is pivoted, at 62, to the frame work of the truck 2, and its opposite end is loosely confined under the strap 63, secured to the frame work of the truck. A similar strap 63² confines one end of a similar bar 61ª, pivoted, at 64, to the sector 58, and, at 65, also pivoted to the frame work of the truck. A spring 66 normally holds the bars 61 and 61ª in the positions shown in Fig. 1. Pivoted at 67 to the bar 61, is the bar 68, through the forward end of which loosely passes the shaft 39, the collars 69 holding the bar 68 against lateral movement with relation to the shaft 39. The aperture in the bar 68, through which passes the shaft 39, is elongated as indicated by dotted lines in Fig. 1. Upon the dash board 70 of the car are mounted the pinions 71 which coöperate with the perpendicular racks 72. To one of the pinions 71 is connected the crank 73. The horizontal rack 74 also meshes with the pinions 71 so that by turning the crank 73 both of the pinions 71 are actuated simultaneously. The lower ends of the perpendicular racks 72 are rigidly secured to the semicircular plate 75 upon which are the rollers 76. Pivotally connected to the arms 9 is the bail 77, the upper portion 77ª of which is bent around, as shown in Fig. 2, so as to hook over the rollers 76. Upon the dash board 70 may be mounted an antifriction roller such as shown at 78. If desired the supplemental arms 9 may be moved upwardly about their pivots 8, and there secured to the hook 80 of the chain 79, which may be of any desired length. Extending from one of the supplemental arms 9 to the other is the rod 81 from which is suspended the net 82. Loosely hanging from the rod 81 is a rod 83, upon the lower end of which is sleeved the tube 84, to which the lower edge of the net 82 is secured, and at the lower end of which is the hook 85 which engages the strap 86 secured to the plate 11, and at the side of which is the hook 87. Projecting from the inside of the arm 9 is the eye 88 through which passes one end of the bar 89, the opposite end of which is slidably mounted upon the studs 90 projecting from the arm 7, and upon its lower side are the rack teeth 91 meshing with the pinion 92 secured to the shaft 33. Upon the upper side of the bar 89 is the notch 93 which receives one end of the trigger 94 pivoted, at 95, to the arm 7.

The operation of the device is as follows:—The plate 11 is raised into its position as shown in Fig. 2, the hook 87 being hooked over the end of the bar 89 (see Figs. 4 and 7); the rack 23 is moved to the left, and there held by the member 29, as previously explained, and clearly shown in Fig. 2. If now, during the travel of the car, an object contact with the fingers 15 the rod 10 will be rotated and, through the levers 16, bar 17, stud 17ª, and lugs 21, the bar 20 will be drawn forward and out of contact with the member 32, allowing the latter to swing downwardly and release the member 29 and permit the rack member 23 to move toward the right under tension of the spring 27, which carries the right hand end of the shaft 39, with its friction wheel 42ª into contact with the traction wheel 4, causing the shaft 39 to rotate, and, through the gear wheels 38, 36 and 35, transmit motion to the shaft 33 and its attached radial projections 34. The shaft 39, in its rearward movement just referred to, rocks the trigger 94 about its pivot 95 and lifts the right hand end of the same out of engagement with the notch 93 (see Fig. 4). The rotation of the shaft 33 with its pinion 92 carries the rod 89 rearwardly and draws the same out of engagement with the hook 87 upon the tube 84 and allows the latter to fall with the rear end of the attached plate 11, the plate, of course, moving about its pivot 10. By this time the object struck contacts with the now revolving projections 34 and is thereby lifted or thrown safely forward upon the plate 11 and against the net 82.

If, for any reason, the fingers 15 should not trip the mechanism as above described, the driver of the car, upon the near approach to an object upon the track, may press upon the treadle 52, causing the reach 55 to move rearwardly which, through the roller 57, sector 58, bars 61 and 61ª, will cause the bar 68 to move backwardly, carrying with it the right hand section of the shaft 39 with its attached wheel 42ª until the latter contacts with the traction wheel 4 and is thereby set in motion. If desired both the shafts 33 and 39 can be constantly rotated by closing the switch 51 and setting in motion the motor 43, which, through the shaft 44, wheels 45, 46 and 48 and ratchet mechanism 48ª, transmits motion to the shaft 39, which, through the chains of parts already described, rotates the shaft 33.

There is a decided advantage in having the motor 43 in reserve, as above explained, in that, if an object be sighted upon the track ahead, the motorman, of course, will shut off the motive power of the car and apply the brake, and, in some instances, the car may be brought almost to a stop by the time the revolving projections 34 reach the object and the revolutions of those projections being so slow at that time may cause the projections to fail to pick up the object and throw it forward upon the plate 11; whereas if, at the time the object is sighted, the motorman judges that the above described condition is likely to occur, he can immediately close the switch 51 and cause the projections 34 to rotate despite the almost stationary condition of the car at the time the projections 34 reach the object. It is obvious that no matter whether the car is traveling in a straight line, or around a curve, the operation of the treadle 52 is effective to cause the rotation of the traction wheels to be transmitted to the working parts of my device.

I do not desire to be limited to the exact construction and arrangement of the parts as hereinabove described, as many modifications thereof are possible without departing from the spirit and scope of the invention.

What I claim as new and desire to protect by Letters Patent is—

1. A vehicle fender comprising in combination, side arms adapted to be pivoted to the vehicle, a shaft revoluble between said arms, radial projections from said shaft, means for transmitting motion from the wheels of the vehicle to said shaft, said means including a sector mounted upon the vehicle; supplemental arms pivoted to the first mentioned arms, a plate pivoted to said supplemental arms forwardly of the said radial projections so as to receive an object thrown forward by said radial projections, means for swinging the said plate upwardly about its pivot, means for holding the plate after it is so swung, and means for automatically freeing the same from said holding means.

2. A vehicle fender comprising in combination, side arms adapted to be pivoted to the vehicle, a shaft revolubly mounted between said arms, radial projections from said shaft, means for transmitting motion from the wheels of the vehicle to said shaft, said means including a sector mounted upon the vehicle and a slidable reach upon the vehicle, said reach being yieldingly held out of engagement with said sector, means for sliding said reach, supplemental arms pivoted to the first mentioned arms forwardly of the said radial projections, a plate pivoted to said supplemental arms and adapted to receive a body thrown forward by said radial projections, means for swinging the said plate upwardly and forwardly about its pivot, means for holding the plate after it is so swung, and automatically acting means for releasing the same from its holding means.

3. A vehicle fender comprising in combination, side arms adapted to be pivoted to the front of the vehicle, a shaft revoluble between said arms, radial projections upon said shaft, means for transmitting motion from the vehicle wheels to the said shaft, said means including a jointed shaft, a sector mounted upon the vehicle and a slidable reach, a pivoted plate adapted to receive a body thrown forward by said radial projections, means for swinging said plate inwardly and upwardly about its pivot and means for holding the said plate after it is so swung, means for automatically releasing said plate from its holding means, a motor carried by the vehicle and capable of continuous operation independent of the motive power of the vehicle, connections between said motor and said jointed shaft whereby power is transmitted to said jointed shaft regardless of whether said means for transmitting motion from the vehicle wheels to said first mentioned shaft is in operative engagement with the vehicle wheels or not.

4. A vehicle fender comprising in combination, side arms adapted to be pivoted to the front of the vehicle, a shaft revoluble between said arms, radial projections from said shaft, means for transmitting motion from the vehicle wheels to said shaft, said means including a sector and a slidable reach upon the vehicle, supplemental arms pivoted to the first mentioned arms and a plate pivoted to said supplemental arms and forwardly of the said radial projections, means upon the vehicle for swinging said supplemental arms about their pivots and holding the same in various positions, said means including a horizontal rack, a crank and a vertical rack.

McKENDRIE A. SPRAGUE.

Witnesses:
 FRED P. GORIN,
 H. RUPERT.